(No Model.)
E. S. LOOMIS.
BANK CHECK.
No. 255,641. Patented Mar. 28, 1882.
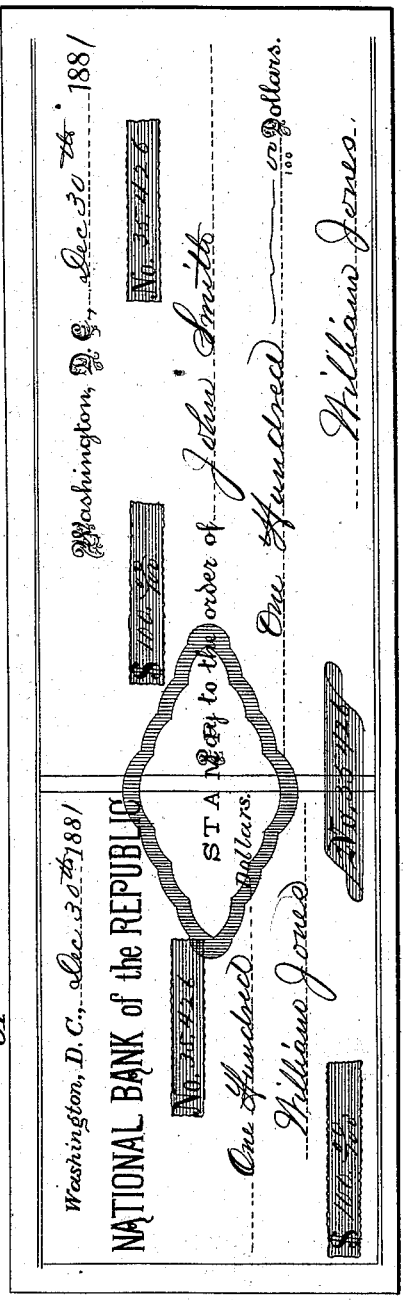
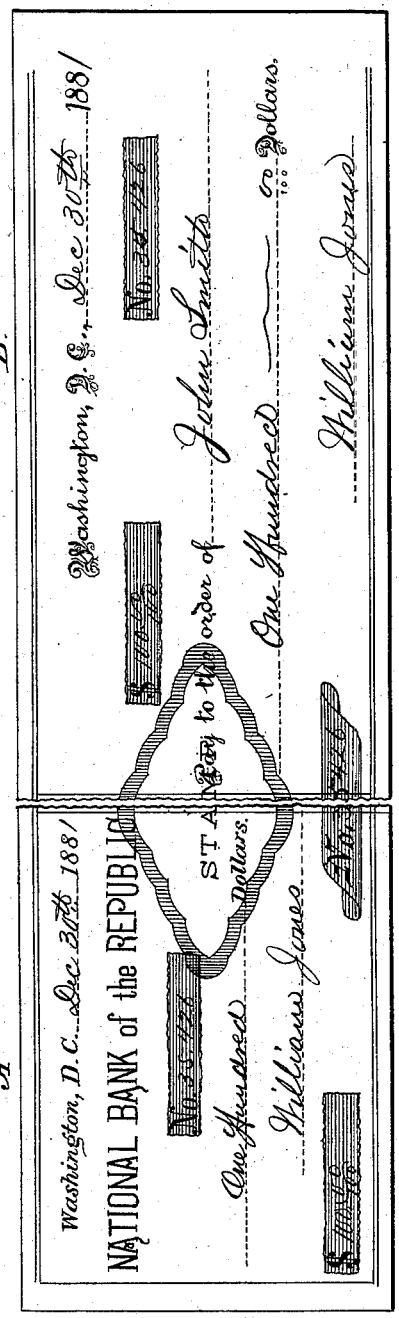
WITNESSES:
Fred G. Dreterich
Edw. U. Byrn
INVENTOR:
Edwin S. Loomis
BY
ATTORNEYS.

UNITED STATES PATENT OFFICE.

EDWIN S. LOOMIS, OF WASHINGTON, DISTRICT OF COLUMBIA.

BANK-CHECK.

SPECIFICATION forming part of Letters Patent No. 255,641, dated March 28, 1882.

Application filed January 6, 1882. (No model.)

*To all whom it may concern:*

Be it known that I, EDWIN S. LOOMIS, of Washington city, District of Columbia, have invented a new and Improved Security Bank-Check; and I do hereby declare that the following is a full, clear, and exact description of the same, reference being had to the accompanying drawings, forming part of this specification, in which—

Figure 1 is a face view of the check entire. Fig. 2 is a face view of the check with the "pay-order" and "bank-notice" detached.

The object of my invention is to provide a form of bank-check or similar instrument which shall prevent forgery and the "raising" of the check, and shall prevent also the collection of the check by fraudulent means.

It consists of a check made in two separable parts, both of which are signed by the drawer, and one of which contains the name of the bank and the amount and number of the check, and constitutes a bank-notice, and the other of which parts contains the name of the party to whom the check is made payable and the amount, without the name of the bank, and which latter part constitutes the pay-order. This pay-order is to be given to the party in whose favor it is drawn, with verbal or separately-written instructions as to what bank it is on, and the bank-notice is to be sent to the bank, which institution is thus enabled to compare and verify the pay-order, when presented, by the bank-notice.

In the drawings is shown my check, which consists of two parts—the bank-notice A and the pay-order B. Neither of these parts is of any value by itself, but both must be presented to a bank to constitute a valid check. The bank-notice A contains no order to pay, but is simply a notice of the number of the pay-order, the amount to be paid, the date, and is signed by the drawer. It also may contain the name of the payee on the back. The pay-order B contains the number of the check, amount to be paid, the date, the name of the payee, the order to pay, and is signed by the drawer, but does not have the name of the bank on which it is drawn. This bank-notice and pay-order, taken together, constitute the "security-check," and the line of division between the two is preferably made to pass through the revenue-stamp, so that the act of severing the parts cancels the stamp, and the ragged edges also afford to the bank means for identifying the two parts by the mesh or correspondence of the adjacent edges of said severed parts.

The invention as thus described is also applicable to bills of exchange, drafts, or any equivalent writing by which money or other property may be transferred. Some of its methods of use may be exemplified as follows:

The check entire may be used as any ordinary check when no special security may be desirable.

For sending money by mail complete security may be had by separating the bank-notice from the pay-order and sending each by separate mail. The bank-notice may be sent to the bank and the pay-order to the payee; or both the bank-notice and pay-order may be sent to the payee.

When the check is payable to order the indorsement may be made on both the pay-order and the bank-notice, thus giving the bank a signature with which to compare with the name on the pay-order. By sending the bank-notice to the bank there is no necessity of having the payee identified. If the pay-order is lost or stolen, the party finding or having the same does not know upon whom the check is drawn, and it is consequently worthless to him. In case of loss of pay-order the payor may send to the bank and withdraw the bank-notice, which will render the pay-order worthless. This covers loss by fire, theft, water, or any other cause, and saves the issuance of an indemnity-bond to secure the payor. A payor may issue pay-orders, reserving the bank-notices, and before the close of bank hours deposit these bank-notices in the bank. This will secure him against counterfeiting, raising, or in any way tampering with the pay-orders. In this case all checks will be payable the next day after they are issued. If desirable to pay the same day, the check may be issued entire. In all cases when the bank-notice and pay-order are separated the payor notifies the payee, verbally or otherwise, on whom the pay-order is drawn, and if the pay-order passes through one or more hands this information must be given to each as they receive the pay-order.

In defining my invention more clearly with respect to what has preceded it in the same class of invention, I would state that I am aware that a check has been invented which had a separable bank-notice attached thereto; but the pay-order in that case contained also the name of the bank, and constituted of itself the ordinary form of check, the object being simply to send for every check a separate notice to the bank. The fact, however, that the pay-order contained the name of the bank involves the very objection which it is my object to avoid, and I therefore disclaim that form.

Having thus described my invention, what I claim as new is—

1. The security bank-check herein described, consisting of two separable parts, one of which bears the name of the bank and the figures identifying the check, and the other of which parts has the name of the person in whose favor it is drawn and the amount, without the name of the bank, and both of which are to be signed by the drawer, as and for the purpose described.

2. The security bank-check consisting of the bank-notice A and the pay-order B, both printed on the same piece of paper, and having the revenue-stamp bisected by the line dividing the said bank-notice from the pay-order, as and for the purpose described.

EDWIN S. LOOMIS.

Witnesses:
 SILAS L. LOOMIS,
 EDWD. W. BYRN.